W. Johnson,
Brick Mold.
Nº 11,127.    Patented June 20, 1854.
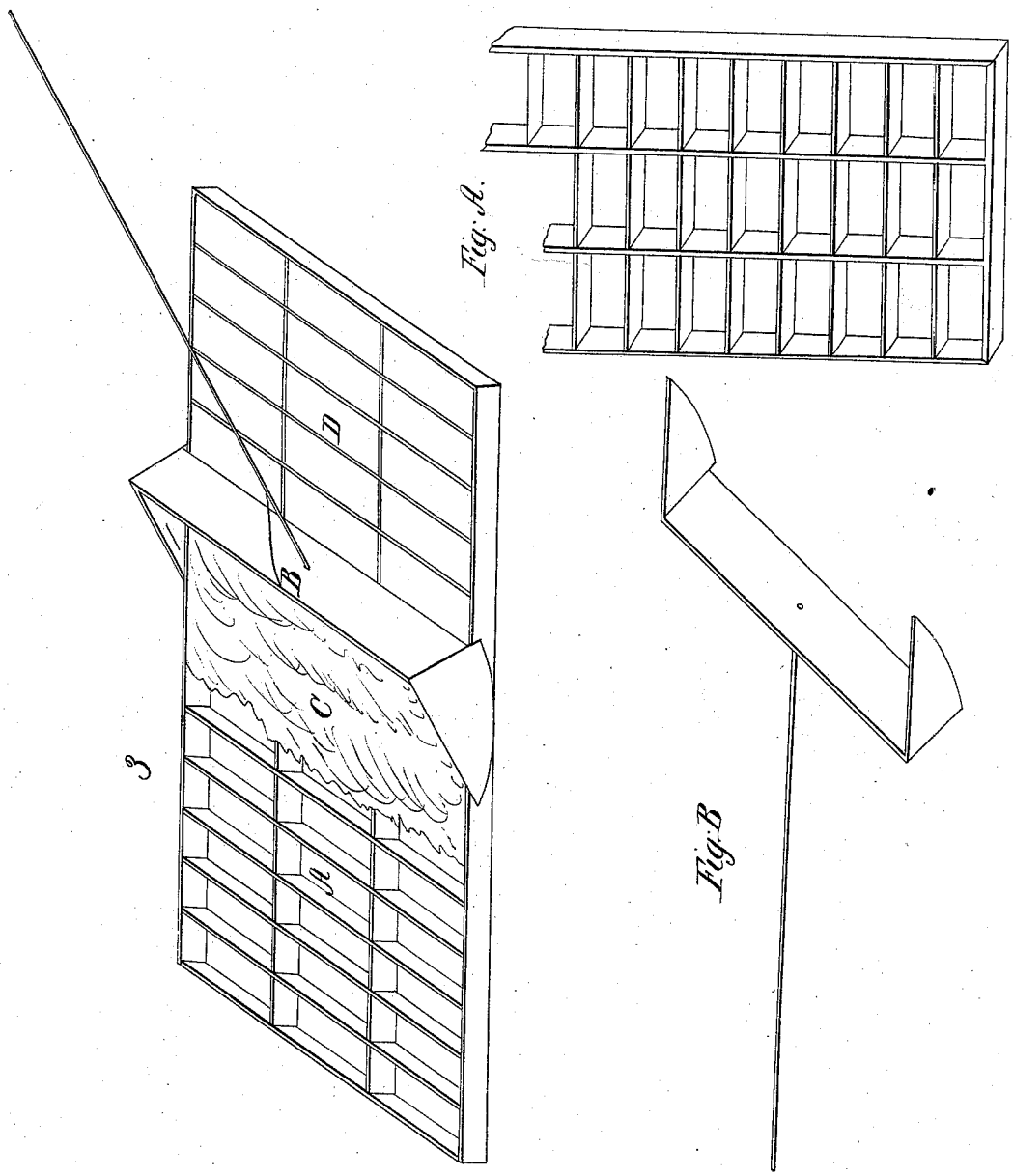

UNITED STATES PATENT OFFICE.

NATHAN JOHNSON, OF NOBLESVILLE, INDIANA.

MODE OF MOLDING BRICKS.

Specification of Letters Patent No. 11,127, dated June 20, 1854.

*To all whom it may concern:*

Be it known that I, NATHAN JOHNSON, of Noblesville, in the county of Hamilton and State of Indiana, have invented a new and useful Machine for Molding Bricks; and I do hereby declare that the following is a full and exact description of the same.

The molds in which the bricks are made represented by Figure A, in the accompanying drawings, are made of half inch boards, without bottoms. They are made wide enough to hold three bricks lengthwise, and may be made long enough to hold an indefinite number. Said figure represents a set of molds that will hold thirty six bricks. The yard should be made level, and as large as desirable. Then there may be placed any number of molds upon it, in tiers, end to end across the yard. After this is done and the molds are sanded or dusted, the mortar, which should always be tempered thin so as to make what is usually termed slop or water brick, is wheeled in in a wheelbarrow to one end of a tier of molds, and turned out onto them. Then the person who attends to the molding, takes the "lute," represented by Fig. B, in the accompanying drawing, and which is made of a board eight inches wide and as long as a tier of molds are wide, with a board fastened to each end of it to keep the mortar from running over the sides of the molds, and passes it over the top of the molds for purpose of filling them and striking off the surplus mortar. After this is done the molds are not to be disturbed, until the bricks become loose in them, which generally requires three or four hours, depending somewhat upon the state of the weather. As soon as the new made bricks become sufficiently loose from the molds to permit it, the molds are lifted off carefully, to be replaced on yard and again refilled.

From the foregoing I do not claim in general, the forming of brick from mold frames placed on the ground, as herein described, this having been done before; but What I do claim is—

1. The mode of at once distributing the mortar, filling the molds and removing the surplus material, viz., by means of the lute applied as herein described.

2. I claim further that with them bricks can be made without the assistance of off bearers and at one fourth less expense than they can be made in any other way.

3. I further claim, that I have fully tested the foregoing plan and that bricks made by it are equal in quality if not superior to those made in any other way, pressed brick not excepted. I tested the plan during the month of last September and have continued and burned bricks.

NATHAN JOHNSON.

Witnesses:
   D. Moss,
   JOSEPH CARLIN.